United States Patent
Kokusho et al.

(10) Patent No.: US 10,627,643 B2
(45) Date of Patent: Apr. 21, 2020

(54) DISPLAY WITH CONTROLLABLE BRIGHTNESS OF AREAS OF SURFACE LIGHT SOURCE PANEL

(71) Applicant: Mitsubishi Electric Corporation, Tokyo (JP)

(72) Inventors: Takafumi Kokusho, Tokyo (JP); Kenji Arita, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/601,192

(22) Filed: May 22, 2017

(65) Prior Publication Data
US 2017/0343827 A1 Nov. 30, 2017

(30) Foreign Application Priority Data

May 30, 2016 (JP) .................. 2016-107213

(51) Int. Cl.
| | |
|---|---|
| G02B 27/22 | (2018.01) |
| G09G 3/34 | (2006.01) |
| F21V 8/00 | (2006.01) |
| F21V 33/00 | (2006.01) |
| G01C 1/02 | (2006.01) |
| G02B 13/00 | (2006.01) |
| G02B 13/12 | (2006.01) |
| H04N 9/77 | (2006.01) |

(52) U.S. Cl.
CPC ...... *G02B 27/2228* (2013.01); *F21V 33/0052* (2013.01); *G01C 1/02* (2013.01); *G02B 6/0018* (2013.01); *G02B 6/0068* (2013.01); *G02B 13/007* (2013.01); *G02B 13/12* (2013.01); *G09G 3/3406* (2013.01); *H04N 9/77* (2013.01); *G02B 6/0023* (2013.01); *G09G 2300/026* (2013.01); *G09G 2320/0233* (2013.01); *G09G 2354/00* (2013.01); *G09G 2360/16* (2013.01); *G09G 2380/10* (2013.01)

(58) Field of Classification Search
CPC ................................................. G09G 3/3406
See application file for complete search history.

(56) References Cited

U.S. PATENT DOCUMENTS

2008/0211990 A1  9/2008 Sakai
2009/0040297 A1* 2/2009 Harada ............ G02F 1/133509
                                                   348/54

(Continued)

FOREIGN PATENT DOCUMENTS

JP          2008-181679 A      8/2008

*Primary Examiner* — Gustavo Polo
(74) *Attorney, Agent, or Firm* — Studebaker & Brackett PC

(57) ABSTRACT

The present invention has an object of providing a display that makes uniform brightnesses of a display image in a plane of a display panel according to a position of an observer. The display includes a display panel, a surface light source panel that emits light toward a back surface of the display panel, a sensor that senses a position of an observer with respect to the display panel, and a controller, wherein a brightness can be adjusted for each of areas of the surface light source panel, and the controller adjusts respective brightnesses of the areas of the surface light source panel so that brightnesses of a display image in a plane of the display panel are made uniform, when the display panel is observed from the position of the observer sensed by the sensor.

17 Claims, 14 Drawing Sheets

(56) References Cited

U.S. PATENT DOCUMENTS

2012/0212466 A1* 8/2012 Kohtoku ............ G02F 1/133385
 345/207
2014/0306879 A1* 10/2014 Oka ........................ G06F 3/013
 345/156

* cited by examiner

F I G . 7
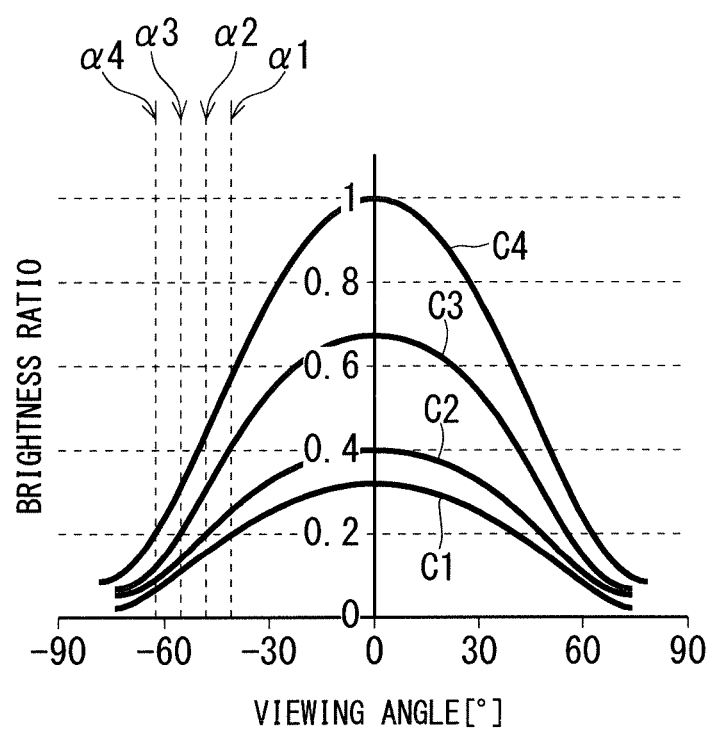

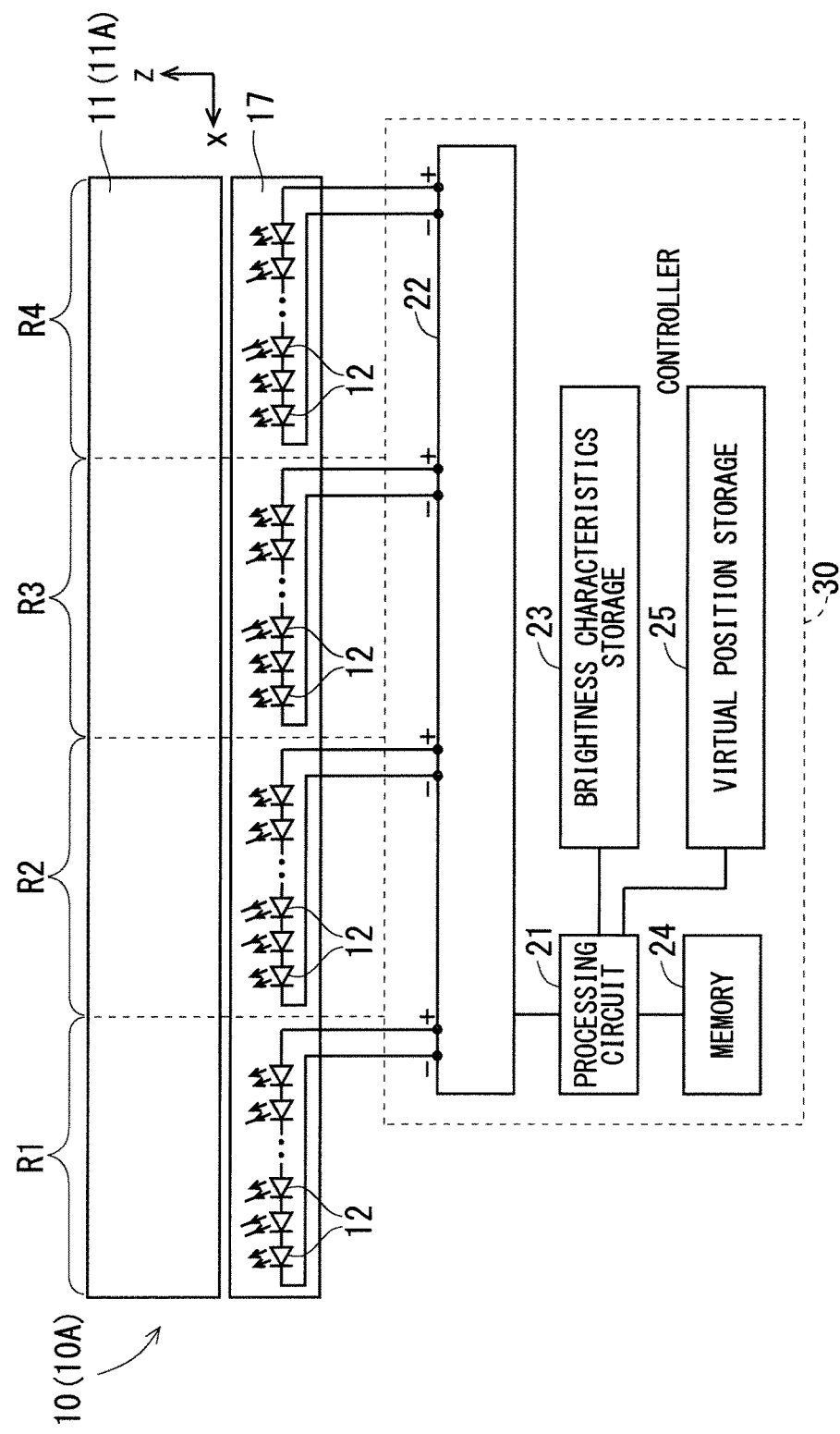

DISPLAY WITH CONTROLLABLE BRIGHTNESS OF AREAS OF SURFACE LIGHT SOURCE PANEL

BACKGROUND OF THE INVENTION

Field of the Invention

The present invention relates to a display.

Description of the Background Art

Generally, displays for use in, for example, electrical equipment of vehicles and other various devices and equipment have a constant distribution of viewing-angle brightness over an entire surface of a display area in a direction normal to a display surface. In other words, the intensity of light emitted from surface light source panels toward the back surfaces of display panels such as liquid crystal display panels is uniform in a light-emitting area.

Since an observer views a point in a display area with respect to a display surface at a different angle depending on a position of the observer with respect to a display, brightnesses of a display image in a plane of the display surface differ. In other words, the observer does not uniformly view the brightness of the display image in a plane of a display panel. The non-uniform brightness in the plane of the display surface becomes more prominent as the display surfaces of displays are enlarged more. Furthermore, the non-uniform brightness becomes more prominent when an observer views, for example, a display of a vehicle-mounted device from a diagonal direction. For example, Japanese Patent Application Laid-Open No. 2008-181679 is known for disclosing a technique of changing the viewing-angle brightness characteristics of a display.

As described above, conventional displays always display an image at a constant brightness over an entire display area irrespective of a position of the observer. Thus, the observer who observes such display from a diagonal direction does not uniformly view the brightnesses of a display image, and the light that the observer does not view causes power loss.

Although Japanese Patent Application Laid-Open No. 2008-181679 discloses the technique of changing the viewing-angle brightness characteristics of a display, the viewing-angle brightness characteristics stay constant in a plane of a display surface even after being changed. This is because the viewing-angle brightness characteristics are uniformly changed over the entire display surface. Thus, the problem with non-uniform brightness on the display surface occurring when the display is viewed from a diagonal direction has not been solved yet.

The present invention has been conceived to solve such problems, and has an object of providing a display that makes uniform the brightnesses of a display image in a plane of a display panel, according to a position of an observer.

SUMMARY

The present invention has an object of providing a display that makes uniform brightnesses of a display image in a plane of a display panel according to a position of an observer.

The display according to the present invention includes: a display panel, a surface light source panel that emits light toward a back surface of the display panel, a sensor that senses a position of an observer with respect to the display panel, and a controller. A brightness can be adjusted for each of areas of the surface light source panel. The controller adjusts respective brightnesses of the areas of the surface light source panel so that brightnesses of a display image in a plane of the display panel are made uniform, when the display panel is observed from the position of the observer sensed by the sensor.

Since the display according to the present invention makes uniform the brightnesses of the display image in the plane of the display panel, the display image with high quality can be displayed to the observer. Furthermore, when the respective brightnesses of the areas of the surface light source panel are adjusted, reducing, with respect to an area having a lower brightness, the brightnesses of the other areas can reduce the power consumption of the display.

These and other objects, features, aspects and advantages of the present invention will become more apparent from the following detailed description of the present invention when taken in conjunction with the accompanying drawings.

BRIEF DESCRIPTION OF THE DRAWINGS

FIG. 7 illustrates viewing-angle brightness characteristics of each of the areas after brightnesses of the display according to Embodiment 1 are adjusted;

FIG. 15 is a block diagram of the display according to Embodiment 3.

DESCRIPTION OF THE PREFERRED EMBODIMENTS

Embodiment 1

[Structure of Display]

Figure 1:
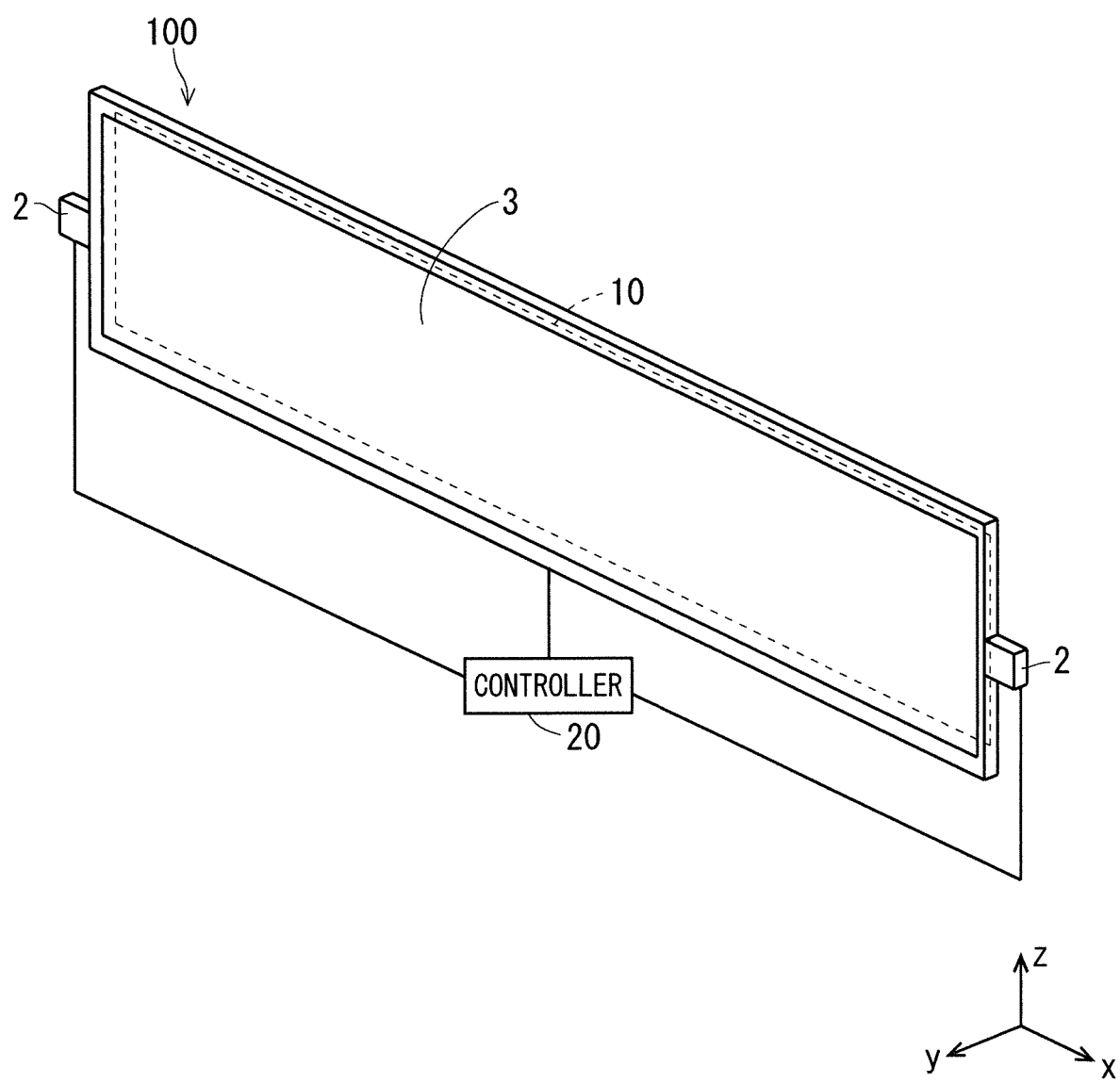
FIG. 1 is a perspective view of a display according to Embodiment 1.

FIG. 1 is a perspective view of a display 100 according to Embodiment 1. As illustrated in FIG. 1, the display 100 includes a display panel 3, a surface light source panel 10, sensors 2, and a controller 20. The surface light source panel 10 emits light toward the back surface of the display panel 3. Each of the sensors 2 senses a position of an observer with respect to the display panel 3. A brightness can be adjusted for each of areas of the surface light source panel 10. The areas here are a first area R1, a second area R2, a third area R3, and a fourth area R4 to be described later.

The controller 20 adjusts respective brightnesses of the areas of the surface light source panel 10 so that brightnesses of a display image in a plane of the display panel 3 are made uniform, when the display panel 3 is observed from the position of the observer that has been sensed by the sensor 2.

As illustrated in FIG. 1, the display panel 3 and the surface light source panel 10 are rectangles longer in a horizontal direction (i.e., an x direction in FIG. 1). Furthermore, the display panel 3 and the surface light source panel 10 are flat according to Embodiment 1.

Figure 2:
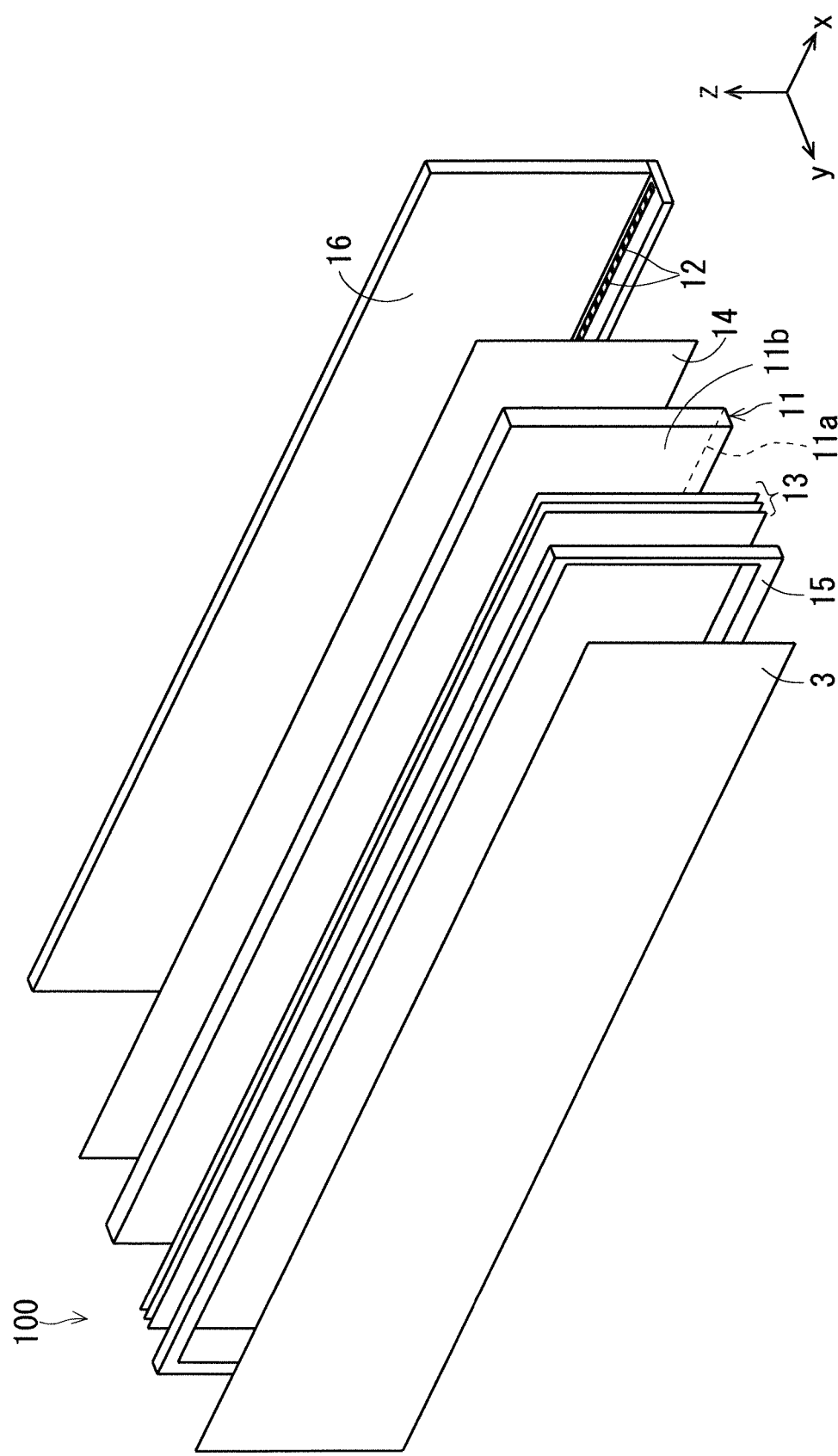
FIG. 2 is an exploded perspective view of the display according to Embodiment 1.

FIG. 2 is an exploded perspective view of the display 100. As illustrated in FIG. 2, the surface light source panel 10 includes a light guide plate 11 and point light sources 12. The point light sources 12 are mounted on a light source substrate that is not illustrated, and the light source substrate is fixed to a rear frame 16. The point light sources 12 mounted on the light source substrate are arranged closer to an incident surface 11a of the light guide plate 11. The light guide plate 11 converts light incident on the incident surface 11a into surface light, and emits the surface light from an emission surface 11b. The emission surface 11b is a surface facing the back surface of the display panel 3. The point light sources 12 may be arranged closer to a surface facing the incident surface 11a of the light guide plate 11.

In other words, arrangement of the point light sources 12 on the surface light source panel 10 is of an edge type. However, the arrangement of the point light sources 12 is not limited to the edge type but may be of, for example, a direct type. The direct type indicates a method of arranging the point light sources 12 on the surface light source panel 10 at respective positions facing the back surface of the display panel 3. When the arrangement of the point light sources 12 on the surface light source panel 10 is of the direct type, the light guide plate 11 does not have to be provided.

Optical sheets 13 are arranged between the emission surface 11b of the light guide plate 11 and the display panel 3. The optical sheets 13 include lens sheets and diffusion sheets that diffuse light.

Furthermore, a light reflection sheet 14 is arranged on the back surface of the light guide plate 11, that is, on a surface opposing the emission surface 11b. As illustrated in FIG. 2, the light guide plate 11, the point light sources 12, the optical sheets 13, and the light reflection sheet 14 are sandwiched between a middle frame 15 and the rear frame 16.

Figure 3:
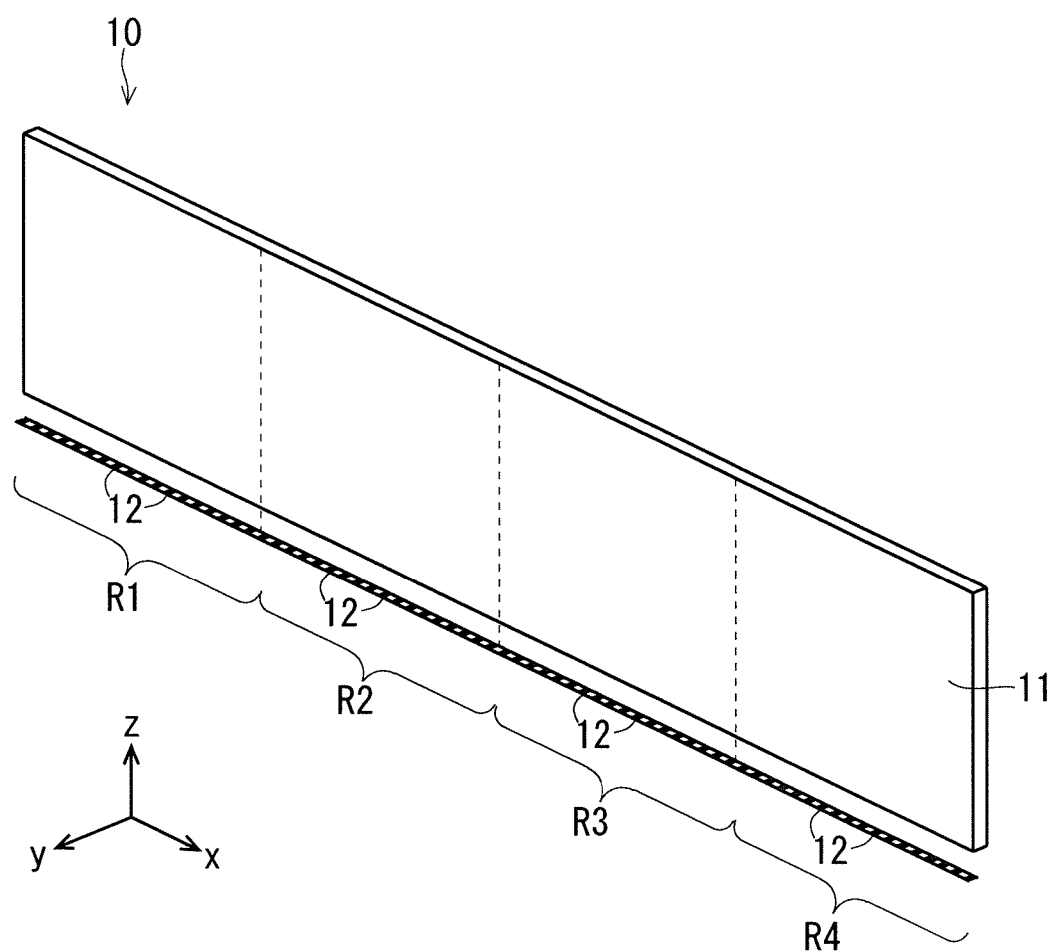
FIG. 3 illustrates areas of a surface light source panel of the display according to Embodiment 1.

FIG. 3 illustrates the areas of the surface light source panel 10. The surface light source panel 10 is divided into the four areas in a longitudinal direction. As illustrated in FIG. 3, the four areas are the first area R1, the second area R2, the third area R3, and the fourth area R4. The brightness of the point light sources 12 included in each of the areas can be adjusted per area.

The first area R1 to the fourth area R4 demonstrate that the brightness of the point light sources 12 arranged in each of the areas can be adjusted per area. The light guide plate 11 and the optical sheets 13, etc. do not have to be divided into areas.

Figure 4:
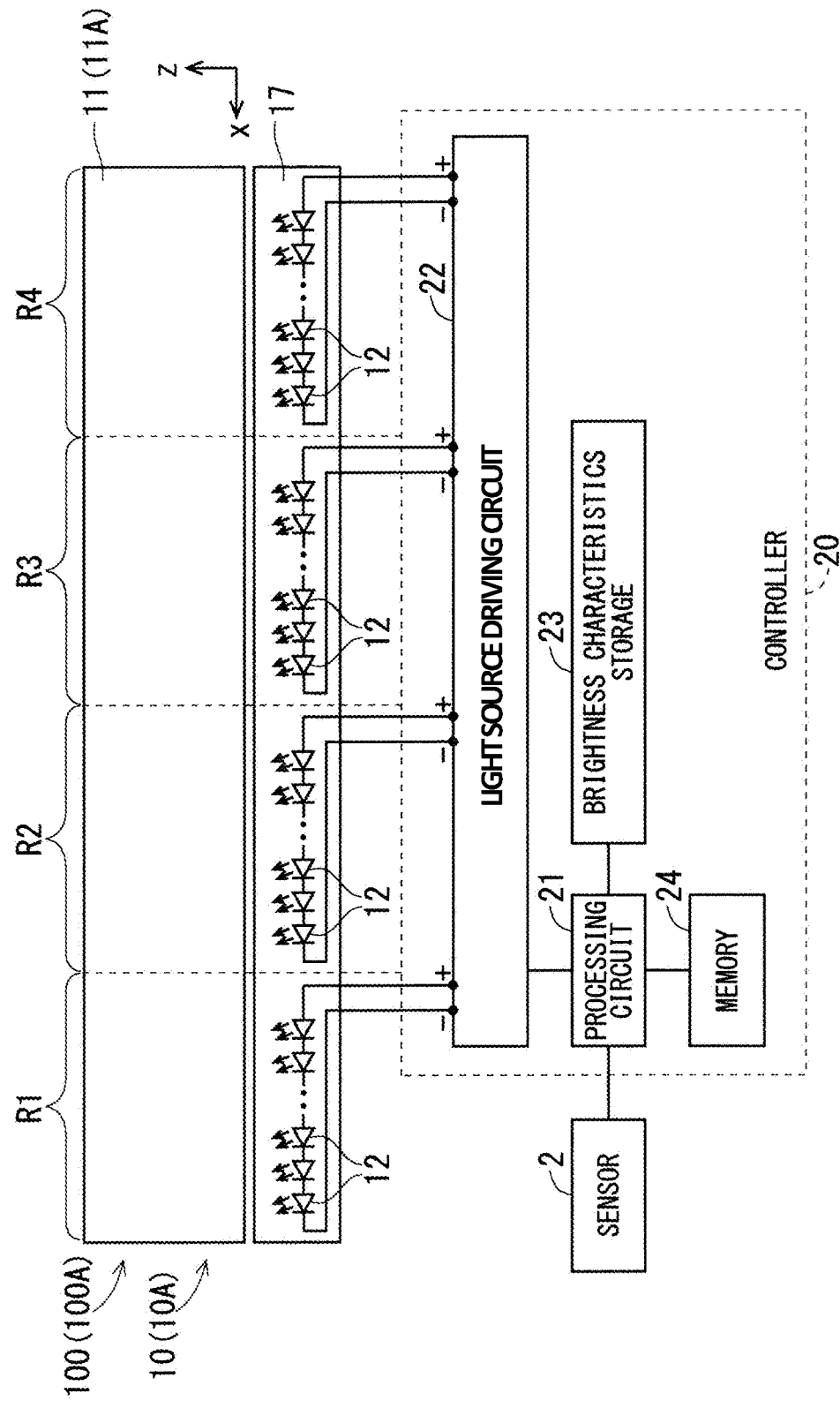
FIG. 4 is a block diagram of the display according to Embodiment 1.

FIG. 4 is a block diagram of the display 100. As illustrated in FIG. 4, the controller 20 includes a processing circuit 21, a light source driving circuit 22, brightness characteristics storage 23, and a memory 24.

Furthermore, the point light sources 12 are connected in series with each other to correspond to the first area R1 of the surface light source panel 10. Similarly, the point light sources 12 are connected in series with each other to correspond to each of the second area R2, the third area R3, and the fourth area R4 of the surface light source panel 10. The point light sources 12 connected in series with each other can be driven by a driving current with a magnitude different for each of the areas.

Although the point light sources 12 are mounted on a seamless light source substrate 17 as illustrated in FIG. 4, each of the first area R1 to the fourth area R4 has an independent circuit pattern on the light source substrate 17.

The processing circuit 21 determines the magnitude of the driving current of the point light sources 12 for each of the first area R1 to the fourth area R4. The light source driving circuit 22 supplies the point light sources 12 in each of the first area R1 to the fourth area R4 with the driving current with the magnitude determined by the processing circuit 21.

In other words, when the display panel 3 is observed from the position of the observer sensed by the sensor 2, the processing circuit 21 controls the light source driving circuit 22 so that the brightnesses of a display image in the plane of the display panel 3 are made uniform to adjust respective brightnesses of the first area R1 to the fourth area R4 of the surface light source panel 10.

Figure 5:
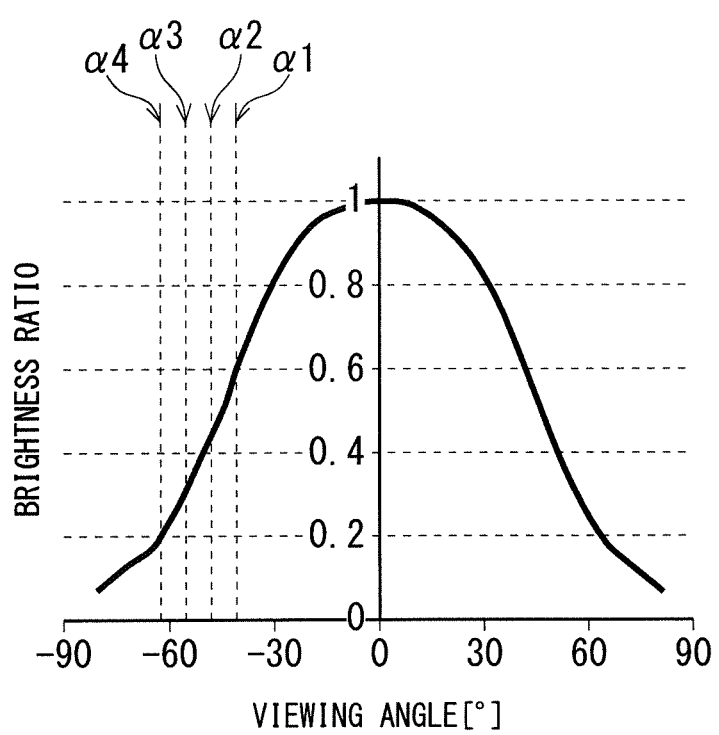
FIG. 5 illustrates viewing-angle brightness characteristics of the display according to Embodiment 1.

The brightness characteristics storage 23 stores dependency of the brightness of the display 100 on a viewing angle. The dependency of the brightness on a viewing angle equates to the viewing-angle brightness characteristics. FIG. 5 illustrates the viewing-angle brightness characteristics when the point light sources 12 are driven by the maximum driving current. In FIG. 5, the brightness ratios along the vertical axis are obtained by normalizing the brightnesses with respect to the maximum brightness. Furthermore, the viewing angles along the horizontal axis in FIG. 5 are angles displaced from a normal direction, assuming that the normal direction is angled at 0° with respect to the display surface of the display panel 3.

The display areas corresponding to the first area R1 to the fourth area R4 of the display 100 have the same viewing-angle brightness characteristics when the point light sources 12 are driven by the current with the same magnitude.

The processing circuit 21 adjusts the respective brightnesses of the first area R1 to the fourth area R4 with reference to the dependency of a brightness on a viewing angle according to the position of the observer sensed by the sensor 2.

According to Embodiment 1, the controller 20 is implemented by the processing circuit 21 and the light source driving circuit 22. Each of the processing circuit 21 and the light source driving circuit 22 may be dedicated hardware or a central processing unit (CPU or may be referred to as a processing unit, an arithmetic unit, a microprocessor, a microcomputer, a processor, or a digital signal processor (DSP)) that executes a program stored in the memory 24.

When each of the processing circuit 21 and the light source driving circuit 22 is dedicated hardware, it is, for example, a single circuit, a composite circuit, a programmed processor, a parallel-programmed processor, an application-specific integrated circuit (ASIC), a field-programmable gate array (FPGA), or any combination of these.

When each of the processing circuit 21 and the light source driving circuit 22 is a CPU, functions of the controller 20 are implemented by software, firmware, or a combination of software and firmware. The software and firmware are described as programs and stored in the memory 24. The processing circuit 21 and the light source driving circuit 22 implement the functions of the controller 20 through reading and executing the programs stored in the memory 24. Furthermore, these programs cause a computer to execute procedures or methods of the processing circuit 21 and the light source driving circuit 22. Here, examples of the memory 24 include non-volatile or volatile semiconductor memories such as random-access memory (RAM), read-only memory (ROM), a flash memory, an electrically programmable read-only memory (EPROM), and an electrically erasable programmable read-only memory (EEPROM), a magnetic disk, a flexible disk, an optical disk, a compact disc, a minidisc, and a DVD.

The functions of the controller 20 may be implemented partly by dedicated hardware and partly by software or firmware.

Furthermore, the brightness characteristics storage 23 is implemented by a non-volatile or volatile semiconductor memory such as RAM, ROM, a flash memory, an EPROM, or an EEPROM.

[Light Reflection Sheet]

The light reflection sheet 14 is made of, for example, a material obtained by mixing barium sulfate or titanium oxide with polyethylene or polyethylene terephthalate, a material formed of a resin with minute bubbles, a material obtained by evaporating silver onto a metal plate, and a material obtained by applying a coating including titanium oxide to a metal plate. Furthermore, the light reflection sheet 14 may be formed of a material with specular reflection. The reflectivity of the light reflection sheet 14 is preferably higher than or equal to 90% to reduce reflection loss on a reflection surface. Since arrangement of the light reflection sheet 14 on the back surface of the light guide plate 11 enables the light leaking from the back surface of the light guide plate 11 to be directed toward the emission surface 11b of the light guide plate 11, the light utilization efficiency can be increased.

[Rear Frame]

As illustrated in FIG. 2, the light source substrate 17 on which the point light sources 12 are mounted is fixed to the rear frame 16. When the point light sources 12 are used as light sources, the rear frame 16 is preferably made of a metal such as aluminum in view of heat dissipation. Increase in heat dissipation of the point light sources 12 can suppress decrease in energy conversion efficiency of the point light sources 12 and increase the light utilization efficiency of the surface light source panel 10.

[Optical Sheets]

The optical sheets 13 are arranged closer to the emission surface 11b of the light guide plate 11 by combining, for example, lens sheets and diffusion sheets. Furthermore, the respective diffusion sheets may be arranged in front of and behind the lens sheets. Furthermore, the optical sheets 13 may be the lens sheets obtained by optimally combining directions of prism to increase the brightness. Two or more of the diffusion sheets may be used to increase the diffusion thereof. Furthermore, the number of the diffusion sheets may be only one or zero. Furthermore, protective sheets, viewing angle control sheets, and polarized reflection sheets may be used as the optical sheets 13. In other words, the optical sheets 13 are arranged in combination according to a desired brightness and light distribution characteristics.

[Display Panel]

As illustrated in FIG. 2, the display panel 3 is arranged closer to an emission surface 11b of the surface light source panel 10. The display panel 3 is, for example, a liquid crystal display panel that applies birefringence of a liquid crystal material. The liquid crystal display panel is obtained by arranging (i) a color filter substrate formed of, for example, a color filter, a light shield layer, and a counter electrode on a substrate, and (ii) a thin film transistor (TFT) substrate formed of, for example, a TFT functioning as a switching element and a pixel electrode on a substrate to face each other. The liquid crystal display panel includes a spacer for maintaining the spacing between the substrates, a sealant for sealing the color filter substrate to the TFT substrate, a liquid crystal material to be sandwiched between the color filter substrate and the TFT substrate, an oriented film for orienting liquid crystal, and a polarizing plate. The liquid crystal display panel displays an image by controlling the orientation of a liquid crystal layer through turning ON or OFF the switching element according to a voltage and by modulating light incident on the liquid crystal display panel according to an image signal.

The display panel 3 is not limited to a liquid crystal display panel. The display panel 3 may be, for example, a display panel obtained by printing characters and graphics on a transparent plate. Furthermore, the display panel 3 may be a display panel of, for example, an organic electroluminescence (EL) display apparatus and a microelectromechanical systems (MEMS) display.

[Light Guide Plate]

The light guide plate 11 has, for example, a flat plate shape with a constant thickness. Furthermore, the light guide plate 11 may be wedge-shaped. The light guide plate 11 is made of, for example, a transparent acrylic resin, a polycarbonate resin, and glass. Furthermore, the light guide plate 11 has, on the back surface thereof, that is, on a surface opposite to the emission surface 11b, a light scattering portion (not illustrated) that guides light toward the emission surface 11b against a light propagation direction. The light scattering portion functions as a means for reflecting off the light toward an inner portion of the light guide plate 11. Dots are printed on the back surface of the light guide plate 11 as the light scattering portion. Furthermore, the back surface of the light guide plate 11 may be roughened to form a grained surface. Furthermore, the back surface of the light guide plate 11 may have minute spheres or depressions and protrusions.

[Light Source]

The point light sources 12 are light emitting diodes (hereinafter referred to as LEDs). Furthermore, the point light sources 12 may be laser diodes (hereinafter referred to as LDs).

The point light sources 12 according to Embodiment 1 are the LEDs mounted on the light source substrate 17. The LEDs include semiconductor light-emitting elements that emit light of single colors such as blue, and pseudo-white LEDs made of a phosphor that absorbs a part of the blue light emitted from the semiconductor light-emitting elements and emits yellow light. Furthermore, the LEDs include LEDs that emit white light by combining three single-colored lights of a red light, a green light, and a blue light that are emitted by respective semiconductor light-emitting elements. The pseudo-white LEDs are used as the point light sources 12 in Embodiment 1. The LEDs that emit single-colored lights may be used depending on use. The light source substrate 17 on which the point light sources 12 are arranged is fixed to the rear frame 16 of the surface light source panel 10.

[Light Source Substrate]

The light source substrate 17 in FIG. 4 has a circuit pattern for mounting the point light sources 12. The light source substrate 17 is formed of flexible printed circuits (FPCs).

Forming the light source substrate 17 of the FPCs enables the heat generated by the point light sources 12 to be efficiently dissipated into the surroundings and the light source substrate 17 to be housed in a limited space of the surface light source panel 10. Furthermore, the light source substrate 17 may be a metal substrate. Using a metal substrate as the light source substrate 17 enables the heat generated by the point light sources 12 to be efficiently dissipated into the surroundings and the point light sources 12 to have higher light-emitting efficiency.

Furthermore, using the single light source substrate 17 in common among the point light sources 12 suppresses increase in the number of the parts of the surface light source panel 10 and contributes to reduction in weight of the display 100.

[Sensor]

The sensor 2 is, for example, an infrared sensor. The sensor 2 includes a light-emitting element that emits infrared radiation, and a light-receiving element that receives the infrared radiation. The light-emitting element and the light-receiving element may be housed in a package or separately arranged. The sensor 2 is not limited to an infrared sensor. The sensor 2 may be, for example, an image sensor such as a camera, and may sense a position of an observer through analyzing an image obtained by the image sensor. As such, the sensor 2 may be any sensor that can sense a position of an observer with respect to the display panel 3. The type of the sensor 2 can be appropriately selected.

Furthermore, a signal indicating the position of the observer sensed by the sensor 2 is transmitted to the controller 20. The controller 20 calculates respective optimal brightnesses of the first area R1 to the fourth area R4 of the surface light source panel 10, on the basis of the position of the observer. Then, the controller 20 adjusts the brightness of each of the areas of the surface light source panel 10.

[Operations]

Figure 6:
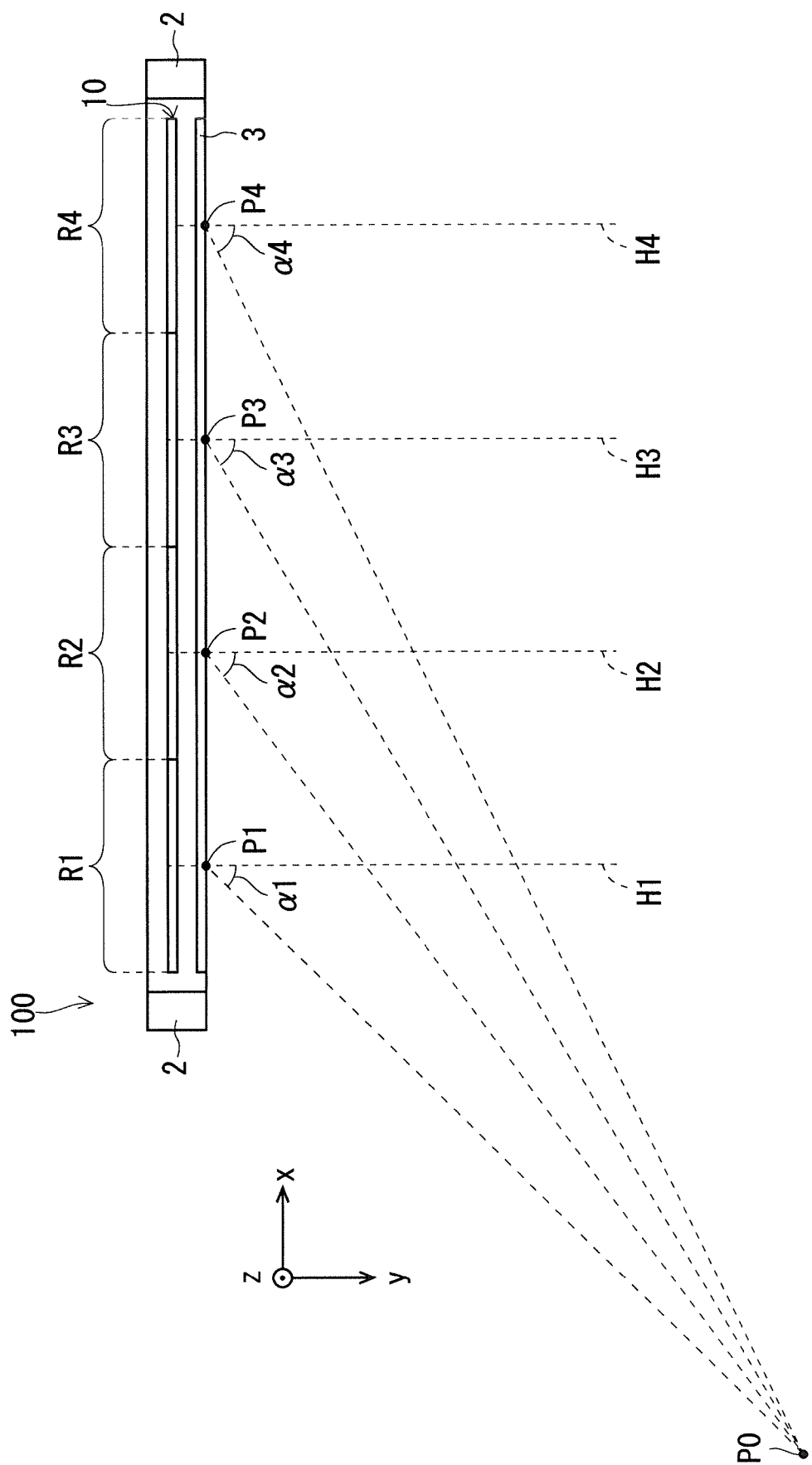
FIG. 6 illustrates a positional relationship between the display according to Embodiment 1 and an observer of the display.

The operations of the display 100 will be described. FIG. 6 illustrates a positional relationship between the display panel 3 of the display 100 and an observer of the display panel 3. As illustrated in FIG. 6, the position of the observer sensed by the sensor 2 is assumed to be a position P0. Furthermore, a position on the display panel 3 that corresponds to the center of the first area R1 of the surface light source panel 10 is defined as a position P1. Similarly, positions on the display panel 3 that correspond to the centers of the second area R2, the third area R3, and the fourth area R4 of the surface light source panel 10 are defined as a position P2, a position P3, and a position P4, respectively. Furthermore, normals extending from the position P1, the position P2, the position P3, and the position P4 with respect to the display surface of the display panel 3 are defined as a normal H1, a normal H2, a normal H3, and a normal H4, respectively.

In FIG. 6, an angle between the normal H1 and a straight line connecting the position P1 to the position P0 of the observer is defined as an angle $\alpha 1$. Similarly, an angle between the normal H2 and a straight line connecting the position P2 to the position P0 is defined as an angle $\alpha 2$. Similarly, an angle between the normal H3 and a straight line connecting the position P3 to the position P0 is defined as an angle $\alpha 3$. Similarly, an angle between the normal H4 and a straight line connecting the position P4 to the position P0 is defined as an angle $\alpha 4$.

First, assume a case where the point light sources 12 in the first area R1 to the fourth area R4 of the surface light source panel 10 are driven by currents with the same magnitude. Here, all the areas have the same viewing-angle brightness characteristics illustrated in FIG. 5. As illustrated in FIG. 5, the brightness ratio of the first area R1 at the angle $\alpha 1$ is read as approximately 0.6. The brightness ratio of the second area R2 at the angle $\alpha 2$ is read as approximately 0.5. The brightness ratio of the third area R3 at the angle $\alpha 3$ is read as approximately 0.3. The brightness ratio of the fourth area R4 at the angle $\alpha 4$ is read as approximately 0.2. As such, the brightnesses of the areas are not uniformly viewed when the display surface of the display panel 3 is observed from the position P0.

Here, the display 100 according to Embodiment 1 adjusts the respective brightnesses of the first area R1 to the fourth area R4 of the surface light source panel 10 so that the brightnesses of a display image in a plane of the display panel 3 are made uniform, when the display panel 3 is observed from the position P0 of the observer.

The controller 20 according to Embodiment 1 reduces the brightnesses of the first area R1, the second area R2, and the third area R3 for adjustment with respect to the lowest brightness ratio of 0.2 that is the brightness ratio of the fourth area R4.

The controller 20 reduces the peak brightness ratio of the first area R1 of the surface light source panel 10 from 1 to 0.2/0.6 (i.e., from 1 to approximately 0.33). FIG. 7 illustrates a curve C1 indicating the viewing-angle brightness characteristics of the first area R1 after the brightness ratio is reduced. Furthermore, the controller 20 reduces the peak brightness ratio of the second area R2 of the surface light source panel 10 from 1 to 0.2/0.5 (i.e., from 1 to approximately 0.4). FIG. 7 illustrates a curve C2 indicating the viewing-angle brightness characteristics of the second area R2 after the brightness ratio is reduced. Furthermore, the controller 20 reduces the peak brightness ratio of the third area R3 of the surface light source panel 10 from 1 to 0.2/0.3 (i.e., from 1 to approximately 0.67). FIG. 7 illustrates a curve C3 indicating the viewing-angle brightness characteristics of the third area R3 after the brightness ratio is reduced.

FIG. 7 also illustrates a curve C4 indicating the viewing-angle brightness characteristics of the fourth area R4 in which the brightness has not been changed. As a result of the brightness adjustment, the brightness ratio of the first area R1 at the angle $\alpha 1$ (curve C1), the brightness ratio of the second area R2 at the angle $\alpha 2$ (curve C2), the brightness ratio of the third area R3 at the angle $\alpha 3$ (curve C3), and the brightness ratio of the fourth area R4 at the angle $\alpha 4$ (curve C4) all become approximately 0.2 and are almost the same as illustrated in FIG. 7. In other words, FIG. 7 shows that the brightnesses of a display image in a plane of the display panel 3 are made uniform when the display panel 3 is observed from the position P0 of the observer.

With respect to an area having the lowest brightness, the brightnesses of the other areas are reduced according to Embodiment 1. Accordingly, it is possible to unify the brightnesses of the display image and reduce the power consumption of the display 100.

Examples of application of the display 100 include automotive applications. When the display 100 is used as a display of a car navigation apparatus, the sensor 2 senses a position of a driver and the brightnesses of the first area R1 to the fourth area R4 are adjusted according to the sensed position. Accordingly, the driver can view a high-quality display image with the uniform brightnesses.

Although the positions P1 to P4 are defined as the respective centers of the areas according to Embodiment 1, they may be appropriately selected according to a positional relationship with the observer, depending on a use or an installation place of the display 100.

Although with respect to an area having the lowest brightness, the brightnesses of the other areas are reduced according to Embodiment 1, the brightnesses of the other areas may be increased for adjustment with respect to the first area R1 having the highest brightness. Furthermore, the brightnesses of the other areas may be reduced or increased for adjustment with respect to the second area R2 or the third area R3 having the intermediate brightness.

Although the surface light source panel 10 is divided into the four areas of the first area R1 to the fourth area R4 according to Embodiment 1, the number of divided areas is not limited to such. Furthermore, although the areas have the same width according to Embodiment 1, the respective widths may be different from one another. The width of each of the areas can be appropriately selected according to the size of a display area, the shape of a display surface, or the placement of the display 100. Furthermore, the adjacent point light sources 12 may be placed at irregular intervals. The intervals of the adjacent point light sources 12 can be appropriately selected according to the size of a display area, the shape of a display surface, or the placement of the display 100. Furthermore, the number of the point light sources 12 arranged in each of the areas is determined according to a required brightness.

Furthermore, although the one divided area of the surface light source panel 10 according to Embodiment 1 includes a set of light sources that are connected in series as illustrated in FIG. 4, the one area may include multiple sets of light sources. Accordingly, even when one set of light sources breaks down in a certain area, the other set of light sources can continue to emit light. Thus, the reliability of the surface light source panel 10 can be increased. Furthermore, it can be expected that the multiple sets of light sources in one area will make a boundary between the areas hard to view, thus increasing the visual quality of the display 100.

Furthermore, although the light guide plate 11 of the surface light source panel 10 is not divided according to Embodiment 1, the light guide plate 11 may be divided into areas to clarify light-emitting boundaries between the areas. Furthermore, the light guide plate 11 does not have to be uniformly thick. The light guide plate 11 may be wedge-shaped.

[Advantages]

The display 100 according to Embodiment 1 includes the display panel 3, the surface light source panel 10 that emits light toward a back surface of the display panel 3, the sensor 2 that senses a position of an observer with respect to the display panel 3, and the controller 20, wherein a brightness can be adjusted for each of areas of the surface light source panel 10, and the controller 20 adjusts respective brightnesses of the areas of the surface light source panel 10 so that brightnesses of a display image in a plane of the display panel 3 are made uniform, when the display panel 3 is observed from the position of the observer sensed by the sensor 2.

The display 100 adjusts the respective brightnesses of the areas of the surface light source panel 10 according to the position of the observer sensed by the sensor 2 so that the brightnesses of a display image in a plane of the display panel 3 are made uniform, when the display panel 3 is observed from the position of the observer. Since the brightnesses of the display image in the plane of the display panel 3 are made uniform, the display image with high quality can be displayed to the observer.

Furthermore, when the respective brightnesses of the areas of the surface light source panel 10 are adjusted, with respect to an area having a lower brightness the brightnesses of the other areas are reduced according to Embodiment 1. Accordingly, it is possible to reduce the power consumption of the display 100. Furthermore, suppressing the output of the point light sources 12 through reduction in the brightnesses can extend the life of the point light sources 12.

Furthermore, the display 100 according to Embodiment 1 further includes the brightness characteristics storage 23 that stores dependency of a brightness of the display panel 3 on a viewing angle. The controller 20 adjusts the respective brightnesses of the areas with reference to the dependency.

Accordingly, the controller 20 adjusts the brightnesses of the areas with reference to the dependency of the brightness on a viewing angle, so that the brightnesses of a display image in the plane of the display panel 3 can be reliably made uniform for the observer.

Furthermore, in the display 100 according to Embodiment 1, the display panel 3 and the surface light source panel 10 are flat. Accordingly, the display 100 described in Embodiment 1 is widely applicable to displays whose display panel 3 and surface light source panel 10 are flat.

Furthermore, in the display 100 according to Embodiment 1, arrangement of at least one light source on the surface light source panel 10 is of an edge type. Accordingly, the display 100 described in Embodiment 1 is widely applicable to displays having a surface light source panel whose arrangement of the light sources is of an edge type.

Furthermore, in the display 100 according to Embodiment 1, arrangement of at least one light source on the surface light source panel 10 may be of a direct type. Accordingly, the display 100 described in Embodiment 1 is widely applicable to displays having a surface light source panel whose arrangement of the light sources is of a direct type.

Embodiment 2

[Structure]

Figure 8:
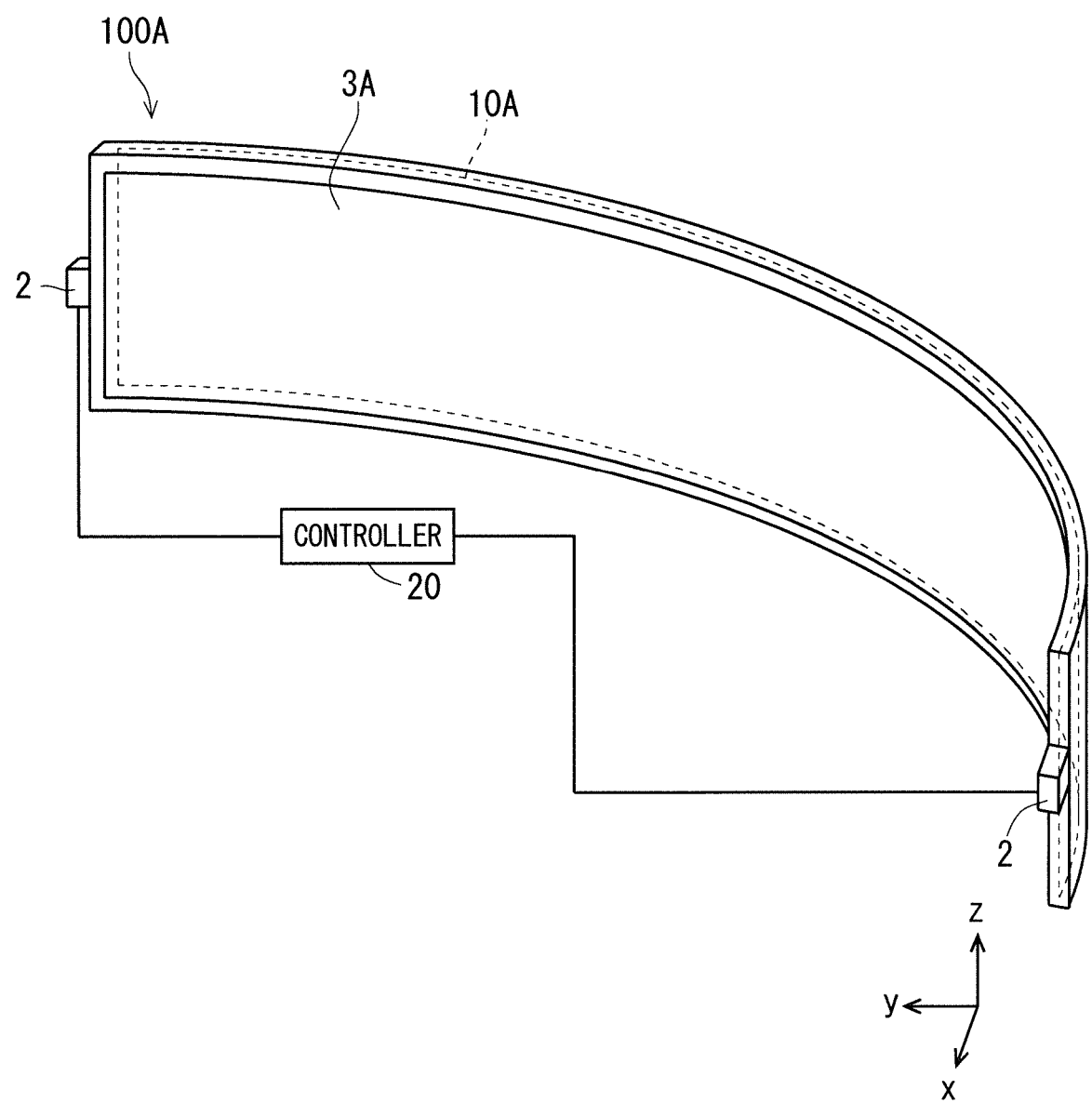
FIG. 8 is a perspective view of a display according to Embodiment 2.

FIG. 8 is a perspective view of a display 100A according to Embodiment 2. The display 100A has a curved shape whose radius of curvature is r. As illustrated in FIG. 8, the display 100A includes a curved display panel 3A, a surface light source panel 10A that is curved to fit the curve of the display panel 3A, the sensors 2, and the controller 20. Since the structures of the sensors 2 and the controller 20 are the same as those in Embodiment 1, the description thereof will be omitted.

The display panel 3A and the surface light source panel 10A are rectangles longer in a horizontal direction according to Embodiment 2. As illustrated in FIG. 8, the display panel 3A and the surface light source panel 10A are curved in an x-y plane.

Figure 9:
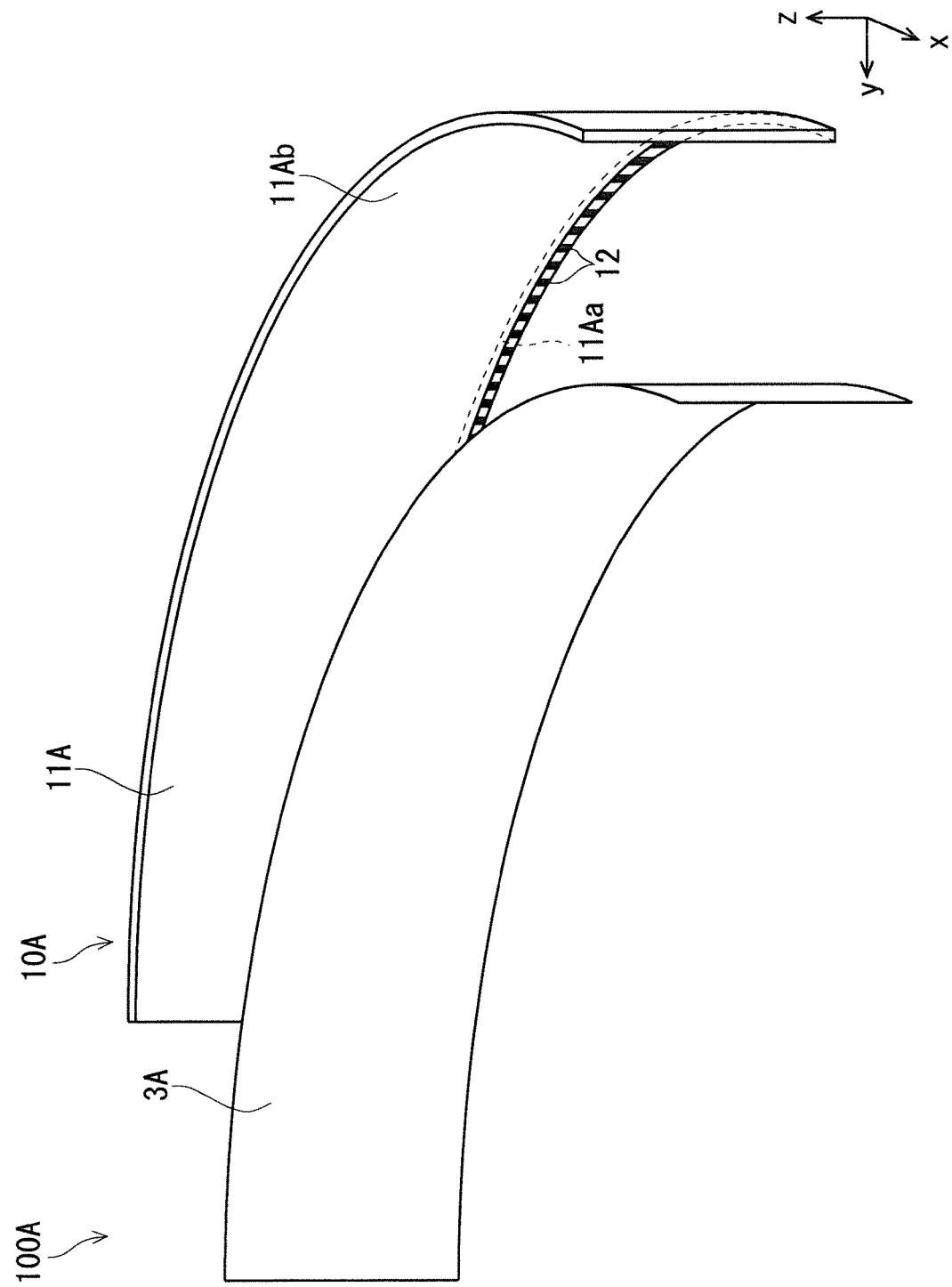
FIG. 9 is an exploded perspective view of the display according to Embodiment 2.

FIG. 9 is an exploded perspective view of the display 100A. As illustrated in FIG. 9, the surface light source panel 10A includes a light guide plate 11A and the point light sources 12. The point light sources 12 are mounted on a light source substrate that is not illustrated, and the light source substrate is fixed to the rear frame 16. The point light sources 12 mounted on the light source substrate are arranged closer to an incident surface 11Aa of the light guide plate 11A. The light guide plate 11A converts light incident on the incident surface 11Aa into surface light, and emits the surface light from an emission surface 11Ab. The emission surface 11Ab is a surface facing the back surface of the display panel 3A.

The arrangement of the point light sources 12 on the surface light source panel 10A is of the edge type according to Embodiment 2. However, the arrangement of the point light sources 12 is not limited to the edge type but may be of, for example, the direct type.

The optical sheets 13, the middle frame 15, and the rear frame 16 that are described in Embodiment 1 have the curved shapes that fit the display panel 3A and the surface light source panel 10A according to Embodiment 2. The parts corresponding to the optical sheets 13, the middle frame 15, and the rear frame 16 are omitted in FIG. 9 to be easily seen.

Figure 10:
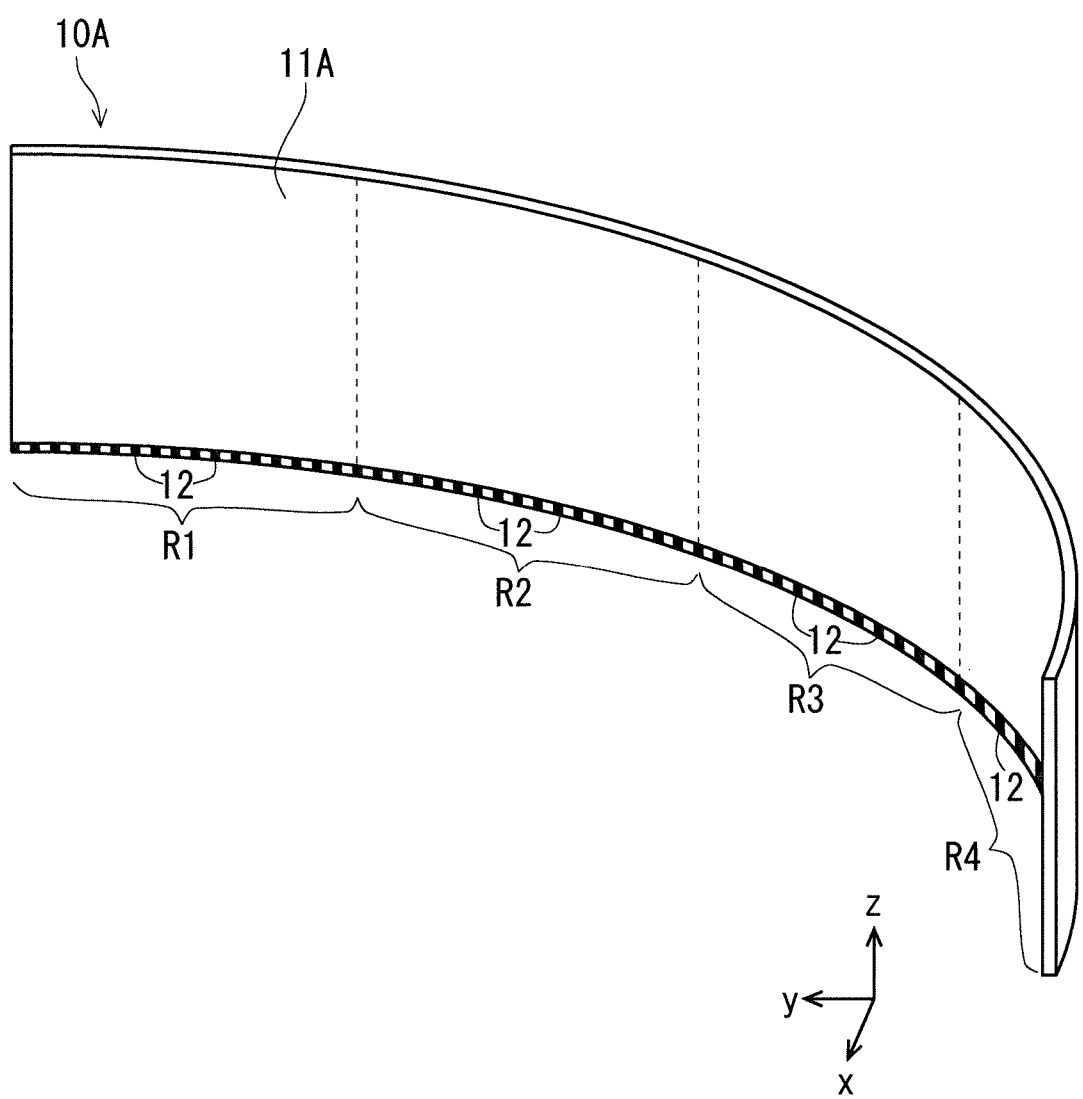
FIG. 10 illustrates areas of a surface light source panel of the display according to Embodiment 2.

FIG. 10 illustrates areas of the surface light source panel 10A. The surface light source panel 10A is divided into the four areas in a longitudinal direction. As illustrated in FIG. 10, the four areas are the first area R1, the second area R2, the third area R3, and the fourth area R4. The brightness of the point light sources 12 included in each of the areas can be adjusted per area.

The first area R1 to the fourth area R4 demonstrate that the brightness of the point light sources 12 arranged in each of the areas can be adjusted per area. The light guide plate 11A and the optical sheets 13, etc. do not have to be divided into areas.

Since the structures of the areas of the surface light source panel 10A, the point light sources 12, and the controller 20 are the same as those in FIG. 4 described in Embodiment 1, the description thereof will be omitted.

[Operations]

Figure 11:
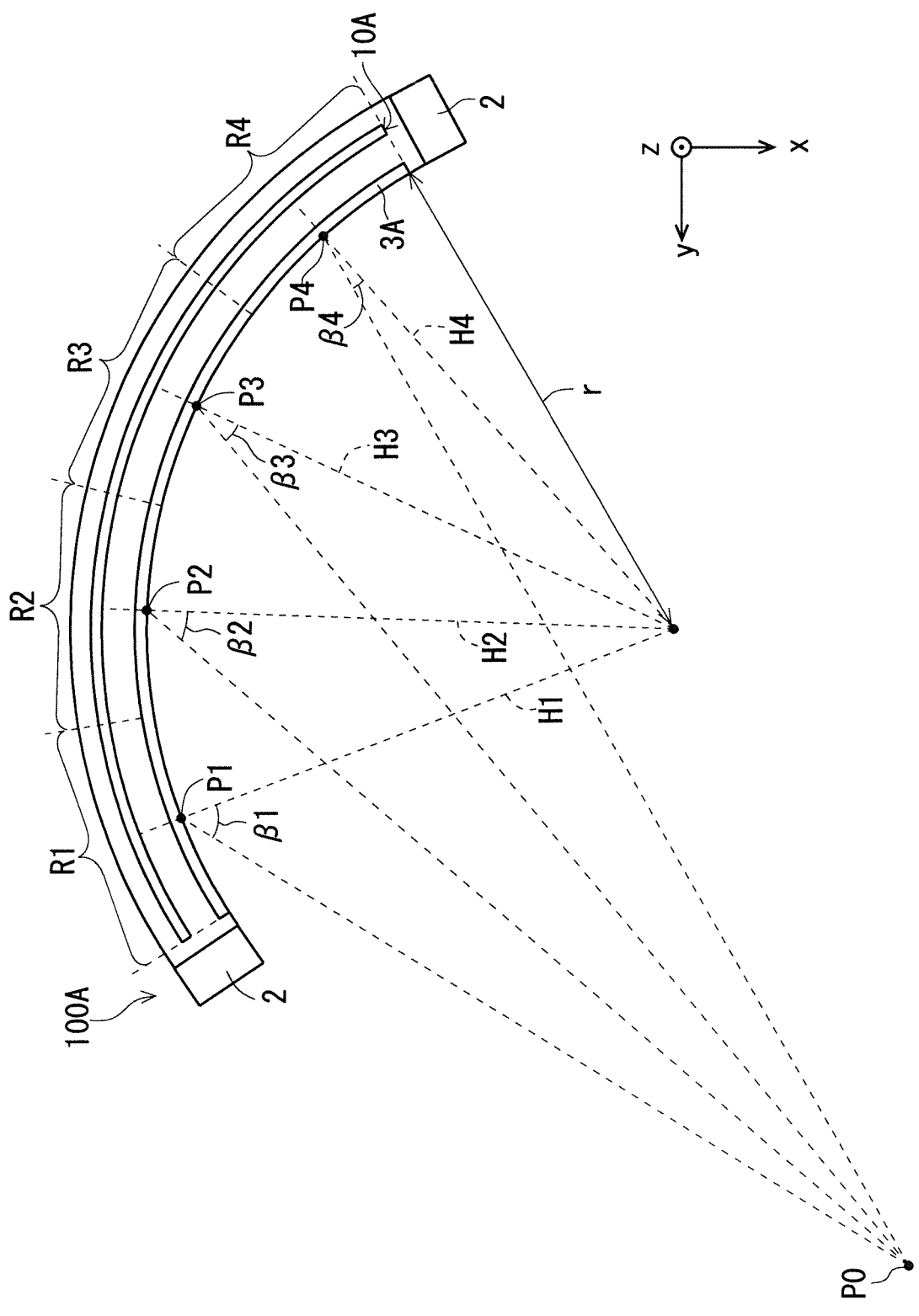
FIG. 11 illustrates a positional relationship between the display according to Embodiment 2 and an observer of the display.

The operations of the display 100A will be described. FIG. 11 illustrates a relationship between the display panel 3A of the display 100A and a position of an observer. As illustrated in FIG. 11, the position of the observer sensed by the sensor 2 is assumed to be a position P0. Furthermore, a position on the display panel 3A that corresponds to the center of the first area R1 of the surface light source panel 10A is defined as a position P1. Similarly, positions on the display panel 3A that correspond to the centers of the second area R2, the third area R3, and the fourth area R4 of the surface light source panel 10A are defined as a position P2, a position P3, and a position P4, respectively. Furthermore, normals extending from the position P1, the position P2, the position P3, and the position P4 with respect to the display surface of the display panel 3A are defined as a normal H1, a normal H2, a normal H3, and a normal H4, respectively.

In FIG. 11, an angle between the normal H1 and a straight line connecting the position P1 to the position P0 of the observer is defined as an angle $\beta 1$. Similarly, an angle between the normal H2 and a straight line connecting the position P2 to the position P0 is defined as an angle $\beta 2$. Similarly, an angle between the normal H3 and a straight line connecting the position P3 to the position P0 is defined as an angle $\beta 3$. Similarly, an angle between the normal H4 and a straight line connecting the position P4 to the position P0 is defined as an angle $\beta 4$.

Figure 12:
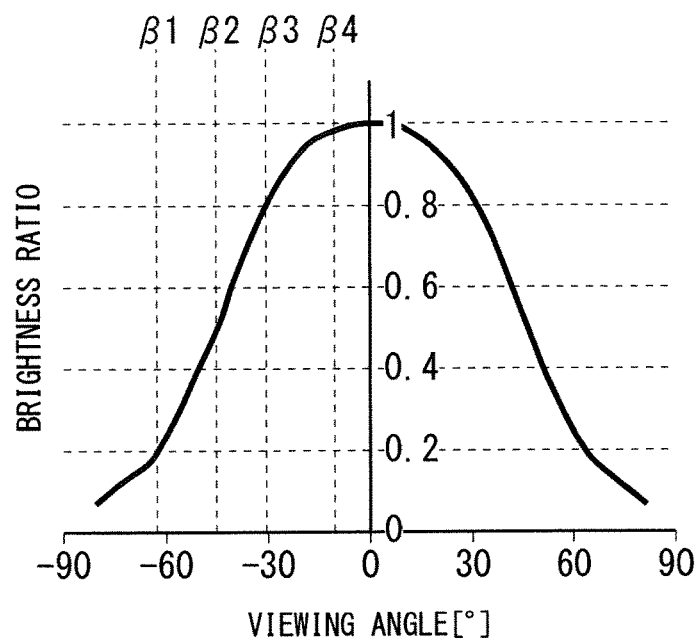
FIG. 12 illustrates viewing-angle brightness characteristics of the display according to Embodiment 2.

First, assume a case where the point light sources 12 in the first area R1 to the fourth area R4 of the surface light source panel 10A are driven by currents with the same magnitude. Here, all the areas have the same viewing-angle brightness characteristics as illustrated in FIG. 12. As illustrated in FIG. 12, the brightness ratio of the first area R1 at the angle $\beta 1$ is read as approximately 0.2. The brightness ratio of the second area R2 at the angle $\beta 2$ is read as approximately 0.5. The brightness ratio of the third area R3 at the angle $\beta 3$ is read as approximately 0.8. The brightness ratio of the fourth area R4 at the angle $\beta 4$ is read as approximately 1. As such, the brightnesses of the areas are not uniformly viewed when the display surface of the display panel 3A is observed from the position P0.

The difference in angle (i.e., a difference between the angles $\beta 1$ and $\beta 4$) of the display 100A whose display surface is curved according to Embodiment 2 is larger than that (i.e., a difference between the angles $\alpha 1$ and $\alpha 4$) of the display 100 whose display surface is flat according to Embodiment 1. In other words, the display 100A tends to have non-uniform brightnesses on the display surface more than those of the display 100.

Here, the display 100A according to Embodiment 2 adjusts the respective brightnesses of the first area R1 to the fourth area R4 of the surface light source panel 10A so that the brightnesses of a display image in a plane of the display panel 3A are made uniform, when the display panel 3A is observed from the position P0 of the observer.

The controller 20 according to Embodiment 2 reduces the brightnesses of the second area R2, and the third area R3, and the fourth area R4 for adjustment with respect to the lowest brightness ratio of 0.2 that is the brightness ratio of the fourth area R4.

Figure 13:
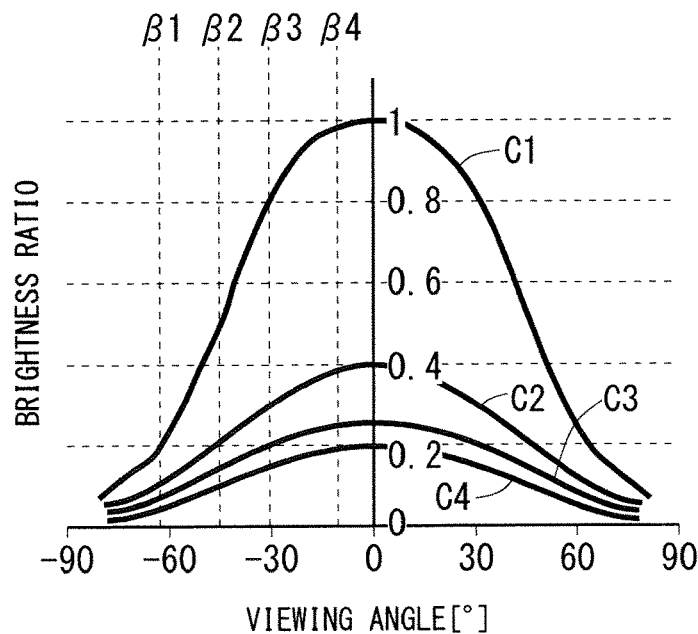
FIG. 13 illustrates viewing-angle brightness characteristics after brightnesses of the display according to Embodiment 2 are adjusted.

The controller 20 reduces the peak brightness ratio of the second area R2 of the surface light source panel 10A from 1 to 0.2/0.5 (i.e., from 1 to approximately 0.4). FIG. 13 illustrates a curve C2 indicating the viewing-angle brightness characteristics of the second area R2 after the brightness ratio is reduced. Furthermore, the controller 20 reduces the peak brightness ratio of the third area R3 of the surface light source panel 10A from 1 to 0.2/0.8 (i.e., from 1 to approximately 0.25). FIG. 13 illustrates a curve C3 indicating the viewing-angle brightness characteristics of the third area R3 after the brightness ratio is reduced. Furthermore, the controller 20 reduces the peak brightness ratio of the fourth area R4 of the surface light source panel 10A from 1 to 0.2/1 (i.e., from 1 to approximately 0.2). FIG. 13 illustrates a curve C4 indicating the viewing-angle brightness characteristics of the fourth area R4 after the brightness ratio is reduced.

FIG. 13 also illustrates a curve C1 indicating the viewing-angle brightness characteristics of the first area R1 in which the brightness has not been changed. As a result of the brightness adjustment, the brightness ratio of the first area R1 at the angle $\beta 1$ (curve C1), the brightness ratio of the second area R2 at the angle $\beta 2$ (curve C2), the brightness ratio of the third area R3 at the angle $\beta 3$ (curve C3), and the brightness ratio of the fourth area R4 at the angle $\beta 4$ (curve C4) all become approximately 0.2 and are almost the same as illustrated in FIG. 13. In other words, FIG. 13 shows that the brightnesses of a display image in a plane of the display panel 3A are made uniform when the display panel 3A is observed from the position P0 of the observer.

With respect to an area having the lowest brightness, the brightnesses of the other areas are reduced according to Embodiment 2. Accordingly, it is possible to unify the brightnesses of the display image and reduce the power consumption of the display 100A.

Although the positions P1 to P4 are defined as the respective centers of the areas according to Embodiment 2, they may be appropriately selected according to a positional relationship with the observer, depending on a use or an installation place of the display 100A.

Although with respect to the first area R1 having the lowest brightness, the brightnesses of the other areas are reduced according to Embodiment 2, the brightnesses of the other areas may be increased for adjustment with respect to the fourth area R4 having the highest brightness. Furthermore, the brightnesses of the other areas may be reduced or increased for adjustment with respect to the second area R2 or the third area R3 having the intermediate brightness.

Although the display 100A is curved with the constant radius of curvature r according to Embodiment 2, it may be curved with a continuously varying curvature.

[Advantages]

The display panel 3A and the surface light source panel 10A are curved in the display 100A according to Embodiment 2. When the display surface of a display is curved, the brightness of the display surface is more non-uniform than that of the flat display surface when the display is viewed from a diagonal direction. Thus, the display 100A according to Embodiment 2 adjusts the brightnesses of the areas of the curved surface light source panel 10A according to the position of the observer sensed by the sensor 2 so that the brightnesses of a display image in a plane of the display panel 3A are made uniform, when the display panel 3A is observed from the position of the observer. Since the brightnesses of the display image in the plane of the display panel 3A are made uniform, the display image with high quality can be displayed to the observer.

Furthermore, when the respective brightnesses of the areas of the surface light source panel 10A are adjusted, with respect to an area having a lower brightness the brightnesses of the other areas are reduced according to Embodiment 2. Accordingly, it is possible to reduce the power consumption of the display 100A. Furthermore, suppressing the output of the point light sources 12 through reduction in the brightnesses can extend the life of the point light sources 12.

Embodiment 3

Figure 14:
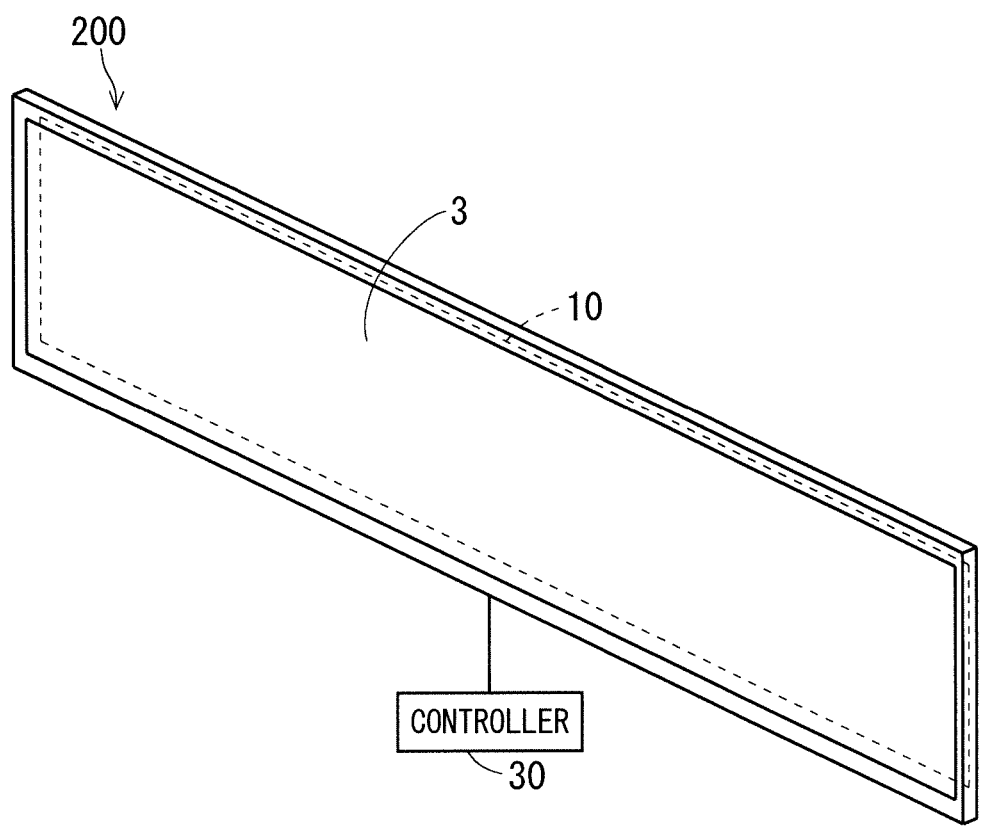
FIG. 14 is a perspective view of a display according to Embodiment 3.

FIG. 14 is a perspective view of a display 200 according to Embodiment 3. As illustrated in FIG. 14, the display 200 includes the display panel 3, the surface light source panel 10, and a controller 30. In contrast to Embodiments 1 and 2, the display 200 according to Embodiment 3 does not include the sensors 2. Since the structures of the display panel 3 and the controller 10 are the same as those in Embodiment 1, the description thereof will be omitted.

FIG. 15 is a block diagram of the display 200, and particularly illustrates a structure of the controller 30. The controller 30 of the display 200 further includes virtual position storage 25 in addition to the controller 20 of the display 100 illustrated in FIG. 4. The controller 20 of the display 100 according to Embodiment 1 receives a signal indicating a position of an observer from the sensor 2. Since the display 200 according to Embodiment 3 does not include the sensors 2 unlike those in Embodiments 1 and 2, the controller 30 does not receives the signal from the sensors 2.

The virtual position storage 25 is implemented by a non-volatile or volatile semiconductor memory such as RAM, ROM, a flash memory, an EPROM, or an EEPROM.

The virtual position storage 25 stores two virtual positions of an observer as, for example, VP1 and VP2. One of the virtual positions VP1 and VP2 is selected according to an operation on the display 200 by the user. Accordingly, the display 200 adjusts the respective brightnesses of the areas (i.e., the first area R1 to the fourth area R4) of the surface light source panel 10 so that the brightnesses of a display image in a plane of the display panel 3 are made uniform, when the display panel 3 is observed from the selected virtual position.

The method of adjusting the brightnesses is the same as that according to Embodiment 1. In other words, the controller 30 of the display 200 replaces the position P0 of the observer according to Embodiment 1 with the selected virtual position VP1 or VP2, and adjusts the respective brightnesses of the first area R1 to the fourth area R4.

The display 200 according to Embodiment 3 is effective when the position of the observer is predetermined. Examples of application of the display 200 include automotive applications. When the display 200 is used as a display of a car navigation apparatus, a position of a driver seated on a driver's seat and a position of an assistant driver seated on a seat of the assistant driver are prestored in the virtual position storage 25 as the virtual positions VP1 and VP2, respectively. The user selects either the virtual position VP1 or VP2 as necessary, so that a display image with the uniform brightnesses in the plane of the display panel 3 can be provided to the driver or the assistant driver.

The number of virtual positions stored in the virtual position storage 25 according to Embodiment 3 is any, and can be plural as necessary.

Although the display 200 according to Embodiment 3 includes a flat display surface similarly as Embodiment 1, it may include a curved display surface similarly as Embodiment 2.

Furthermore, when a position of the observer is restricted to one for the display 200 and the display panel 3 is observed from a predetermined position of the observer, respective brightnesses of the areas of the surface light source panel 10 may be adjusted in advance so that the brightnesses of a display image in a plane of the display panel 3 are made uniform. Here, the display 200 does not have to include the virtual position storage 25.

[Advantages]

The display 200 according to Embodiment 3 includes: the display panel 3; the surface light source panel 10 that emits light toward the back surface of the display panel 3; the controller 30; and the virtual position storage 25, wherein a brightness can be adjusted for each of areas of the surface light source panel 10, the virtual position storage 25 prestores virtual positions of an observer with respect to the display panel 3, and the controller 30 adjusts respective brightnesses of the areas of the surface light source panel so that brightnesses of a display image in a plane of the display panel 3 are made uniform, when one of the virtual positions is selected and the display panel 3 is observed from the selected one of the virtual positions.

The display 200 adjusts, according to the selected virtual position of the observer, the respective brightnesses of the areas of the surface light source panel 10 so that the brightnesses of a display image in a plane of the display panel 3 are made uniform, when the display panel 3 is observed from the virtual position. Since the brightnesses of the display image in the plane of the display panel 3 are made uniform, the display image with high quality can be displayed to the observer who observes the display 200 from the virtual position. Furthermore, when the respective brightnesses of the areas of the surface light source panel 10 are adjusted, reducing, with respect to an area having a lower brightness, the brightnesses of the other areas can reduce the power consumption of the display 200.

The display 200 according to Embodiment 3 includes the display panel 3 and the surface light source panel 10 that emits light toward a back surface of the display panel 3, wherein a brightness can be adjusted for each of areas of the surface light source panel 10, and respective brightnesses of the areas of the surface light source panel 10 may be adjusted so that brightnesses of a display image in a plane of the display panel 3 are made uniform, when the display panel 3 is observed from a predetermined position.

The display 200 may adjust the respective brightnesses of the areas of the surface light source panel 10 so that the brightnesses of a display image in a plane of the display panel 3 are made uniform, when the display panel 3 is observed from a predetermined position. Since the brightnesses of the display image in the plane of the display panel 3 are made uniform, the display image with high quality can be displayed to the observer who observes the display 200 from the predetermined position. Furthermore, when the respective brightnesses of the areas of the surface light source panel 10 are adjusted, reducing, with respect to an area having a lower brightness, the brightnesses of the other areas can reduce the power consumption of the display 200.

Embodiments of the present invention can be freely combined, and appropriately modified or omitted within the scope of the invention.

While the invention has been shown and described in detail, the foregoing description is in all aspects illustrative and not restrictive. It is therefore understood that numerous modifications and variations can be devised without departing from the scope of the invention.

What is claimed is:

1. A display, comprising:
a display panel;
a surface light source panel that emits light toward a back surface of said display panel;
a sensor that senses a position of an observer with respect to said display panel; and
a controller,
wherein said surface light source panel is divided into predetermined areas and a brightness can be adjusted independently for each of said predetermined areas,
said controller is configured to independently adjust respective brightnesses of each of said predetermined areas of said surface light source panel according to a positional relationship between said display panel and said position of said observer sensed by said sensor, and
a combination of the independently adjusted respective brightness makes a uniformly perceived brightness of a display image in a plane of said display panel from an observing point at said position of said observer sensed by said sensor.

2. The display according to claim 1, further comprising brightness characteristics storage,
said brightness characteristics storage stores dependency of a brightness of said display on a viewing angle, and
said controller is configured to independently adjust said respective brightnesses of each of said predetermined areas with reference to said dependency.

3. The display according to claim 1,
wherein said display panel and said surface light source panel are flat.

4. The display according to claim 1,
wherein said display panel and said surface light source panel are curved.

5. The display according to claim 1,
wherein arrangement of at least one light source on said surface light source panel is of an edge type.

6. The display according to claim 1,
wherein arrangement of at least one light source on said surface light source panel is of a direct type.

7. A display, comprising:
a display panel;
a surface light source panel that emits light toward a back surface of said display panel;
a controller; and
virtual position storage,
wherein said surface light source panel is divided into predetermined areas and a brightness can be adjusted independently for each of said predetermined areas,
said virtual position storage prestores virtual positions of an observer with respect to said display panel,
when one of said virtual positions is selected and said display panel is observed from said selected one of said virtual positions, said controller is configured to independently adjust respective brightnesses of each of said predetermined areas of said surface light source panel according to a positional relationship between said display panel and said selected one of said virtual positions, and
a combination of the independently adjusted respective brightness makes a uniformly perceived brightness of a display image in a plane of said display panel from an observing point at said selected one of said virtual positions.

8. The display according to claim 7, further comprising brightness characteristics storage,
said brightness characteristics storage stores dependency of a brightness of said display on a viewing angle, and
said controller is configured to independently adjust said respective brightnesses of each of said predetermined areas with reference to said dependency.

9. The display according to claim 7,
wherein said display panel and said surface light source panel are flat.

10. The display according to claim 7,
wherein said display panel and said surface light source panel are curved.

11. The display according to claim 7,
wherein arrangement of at least one light source on said surface light source panel is of an edge type.

12. The display according to claim 7,
wherein arrangement of at least one light source on said surface light source panel is of a direct type.

13. A display, comprising:
a display panel; and
a surface light source panel that emits light toward a back surface of said display panel,
wherein said surface light source panel is divided into predetermined areas and a brightness can be adjusted independently for each of said predetermined areas,
when said display panel is observed from a predetermined position, respective brightnesses of each of said predetermined areas of said surface light source panel are independently adjusted according to a positional relationship between said display panel and said position of said predetermined position, and
a combination of the independently adjusted respective brightness makes a uniformly perceived brightness of a display image in a plane of said display panel from an observing point at said position of said predetermined position.

14. The display according to claim 13,
wherein said display panel and said surface light source panel are flat.

15. The display according to claim 13,
wherein said display panel and said surface light source panel are curved.

16. The display according to claim 13,
wherein arrangement of at least one light source on said surface light source panel is of an edge type.

17. The display according to claim 13,
wherein arrangement of at least one light source on said surface light source panel is of a direct type.

* * * * *